United States Patent [19]
Holdahl et al.

[11] 4,398,579
[45] Aug. 16, 1983

[54] LATHE WORK CENTERS

[75] Inventors: Robert A. Holdahl, Hopkins; Paul S. Petersen, Minnetonka, both of Minn.

[73] Assignee: Toolmark Co., Minneapolis, Minn.

[21] Appl. No.: 245,887

[22] Filed: Mar. 20, 1981

[51] Int. Cl.³ .............................................. B23B 33/00
[52] U.S. Cl. .................................... 142/53; 82/40 R; 144/209 A
[58] Field of Search ..................... 142/53, 57; 144/209; 82/40 R, 45, 33 R

[56] References Cited

U.S. PATENT DOCUMENTS

| | | | |
|---|---|---|---|
| 307,901 | 11/1884 | Barnes | 82/33 |
| 337,648 | 3/1886 | Allington | 144/209 R |
| 758,881 | 5/1904 | Yost | 142/55 |
| 764,523 | 7/1904 | Curtis | 142/55 |
| 2,337,727 | 12/1943 | Sandelin, Jr. | 142/53 |
| 2,346,192 | 4/1944 | Schwartz | 142/1 |
| 2,876,807 | 3/1959 | Christensen | 142/55 |
| 2,879,816 | 3/1959 | Cook et al. | 144/209 |
| 2,909,955 | 10/1959 | Williams | 82/40 |
| 2,923,328 | 2/1960 | Colledge, Jr. | 142/53 |
| 3,044,511 | 7/1962 | Wieckman et al. | 144/209 R |
| 4,141,397 | 2/1979 | Schmidt | 144/209 |
| 4,271,881 | 6/1981 | Hitt | 142/53 |

FOREIGN PATENT DOCUMENTS 845887 8/1952 Fed. Rep. of Germany ..... 82/40 R
17622 of 1901 United Kingdom ............... 82/33 R

*Primary Examiner*—Leonidas Vlachos
*Attorney, Agent, or Firm*—Kinney, Lange, Braddock, Westman and Fairbairn

[57] ABSTRACT

A lathe work center device centers a workpiece about an axis of rotation on a lathe. The lathe has two tool centers with at least one tool center being driven and both tool centers coaxially positioned about the axis of rotation. The work center device includes a substantially flat main ring portion having an outer periphery. A plurality of spurs integral with the main ring portion project toward and are embedded within the workpiece. The spurs are positioned on a side of the ring portion that is adjacent to the workpiece, proximate the outer periphery. A centering portion integral with the main ring portion projects outwardly therefrom on a side of the main ring portion opposite the spurs. Preferably, the centering portion has a frusto conical configuration and engages the tip of a tool center, locating the workpiece about the axis of rotation. A plurality of lugs proximate the outer periphery engage cooperating slots in the driven tool center for rotating the workpiece.

2 Claims, 6 Drawing Figures

LATHE WORK CENTERS

BACKGROUND OF THE INVENTION

1. Field of the Invention

The present invention relates to devices that hold and center a workpiece about an axis of rotation of a lathe.

2. Description of the Prior Art

Wood turning lathes typically have a driven tool center at the headstock end, and either a tool center that freely rotates (live center) or a dead center that does not rotate at the tailstock end. The driven center typically has a plurality of spurs or projections, and in some cases, a conical tip to engage the workpiece. The projections and the conical tip are pounded or forced into one end of the workpiece. The purpose of the conical tip is to center the workpiece while the projections provide a mechanical connection to transmit the driving force from the driven tool center to the workpiece.

Dead tool centers normally have an inverted conical ring which engages the workpiece, although dead tool centers have been known to have a central conical tip. Live tool centers, on the other hand, rotate on bearings and have a protruding conical tip which engages the workpiece. Dead tool centers, since they do not rotate, generate heat from frictional engagement between the tip and the workpiece creating a hole in the workpiece. Lubricants such as bee's wax have been used to reduce friction, but the results have not been satisfactory. Live tool centers, having a sharp conical point, tend to split the wood workpiece when axial pressure is applied to hold the wood workpiece between the tool centers of the lathe.

A further problem with the prior art relates to maintaining the same axial center position when the workpiece is removed and reinserted back into the lathe. The projections of the prior art drive centers generally do not re-seat in the same holes in the wood workpiece that were previously formed, thereby causing the wood workpiece to be off the previous center resulting in difficulties in the wood turning operation.

In certain other operations, it is desirable to remove the wood workpiece and reinsert it in the lathe end-for-end. This operation causes even greater difficulties in attempting to re-center the wood workpiece about the previous center of rotation. Consequently when using the prior art devices, most turning operations are completed before removing the wood workpiece from the lathe.

Some of the prior art devices are described in the following prior art patents. Schwartz U.S. Pat. No. 2,346,192 shows a tool center with an end having a step configuration and spurs projecting therefrom. The tool center of the Schwartz patent, however, is limited to workpieces which have two halves temporarily united for the turning operation on a lathe.

Barnes U.S. Pat. No. 307,901; the Cook et al U.S. Pat. No. 2,879,816; and the Schmidt U.S. Pat. No. 4,141,397 show chuck assemblies for holding workpieces within a lathe. None of the chuck assemblies of the immediately above-cited patents provides for reinsertion and centering of the workpiece along the same axis of rotation.

The Christensen U.S. Pat. No. 2,876,807; the Williams U.S. Pat. No. 2,909,955; and the Colledge U.S. Pat. No. 2,923,238 describe tool centers which have a conical tip and projections of different configurations which engage the workpiece. Although the devices in the immediately-above cited patents provide for some centering of the workpiece, they do not solve the previously-mentioned problems of splitting the workpieces, frictionally burning the ends of the workpieces, and when reinserting the workpiece, having the workpiece rotating about a different axis than when doing the previous work.

SUMMARY OF THE INVENTION

The present invention includes a device called a workpiece center for centering a workpiece about an axis of rotation on a lathe. The workpiece is centered by the device which stays with the detachable workpiece when the workpiece is removed and when it is reinserted insures that the workpiece will rotate about the same axis of rotation as before.

The lathe typically includes at least one driver tool center and a second center coaxially positioned about the axis of rotation of the lathe. The device of the present invention includes a substantially flat main ring portion having an outer periphery. A plurality of spurs integral with the main ring portion project toward and are embedded within the workpiece. The spurs are located on a side of the main ring portion adjacent the workpiece and are proximate the outer periphery of the main ring portion. A centering portion integral with the main ring portion receives the lathe centers to center the workpiece about the axis of rotation of the lathe, the slot is preferably a frusto conical surface. Lugs on the workpiece center engage slots provided in the driven tool center to transmit force to turn the workpiece.

The device of the present invention is embedded into the end of a workpiece and stays with the workpiece from one lathe operation to another. Since the present invention provides a device for centering the workpiece that stays with the workpiece, the workpiece may be removed and placed in another lathe in a commercial situation where a quantity of workpieces must go through progressive cutting operations on different lathes. The present invention eliminates the time expended in centering the workpieces during changes and avoids the damage done to the ends of the workpieces from repeated mounts and dismounts, thereby reducing manufacturing costs.

DETAILED DESCRIPTION OF THE PREFERRED EMBODIMENTS

Figure 1:
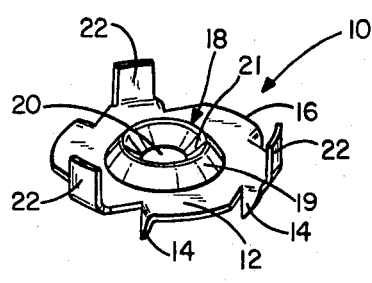
FIG. 1 is a perspective view of one side of a preferred embodiment of the device of the present invention.
Figure 2:
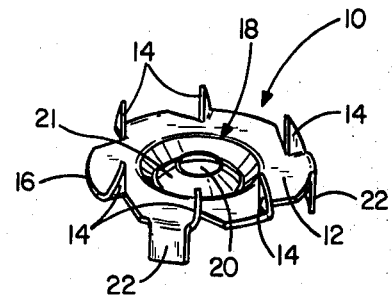
FIG. 2 is a perspective view of the other side of the device shown in FIG. 1.

The work center device of the present invention is generally indicated at 10 in FIGS. 1 and 2. The work center device 10 is used for centering preferably wooden workpieces about an axis or center of rotation on a lathe. The device 10 includes a substantially flat main ring portion 12 and a plurality of spurs 14 are integral with the main ring portion 12 and projecting outwardly therefrom. The spurs 14 are preferably located proximate an outer periphery 16 of the main ring portion 12.

The work center 10 has a centering seat portion 18 integral with the main ring portion 12 and which preferably is formed with a frusto conical surface 19 projecting from the main ring portion 12 and a frusto-conical seat surface 21. The surface 21 has an aperture 20 in the center. The centering portion 18 projects on a side of the main ring portion opposite of the spurs 14. Drive lugs 22 are preferably located on the outer periphery of the main ring portion 12 and project in a direction opposite from the spurs 14.

The main ring portion 12, the spurs 14, the centering portion 18 and the lugs 22 are preferably formed from one flat piece. The work center device 10 is preferably made of metal with the above mentioned elements formed in a conventional manufacturing method.

Figure 3:
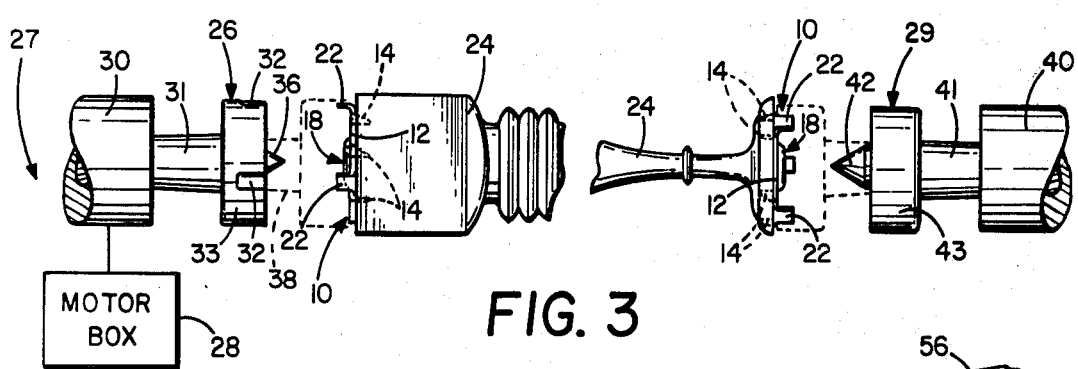
FIG. 3 is a side elevational view showing a workpiece with the device of the present invention between the tool centers of the lathe.
Figure 4:
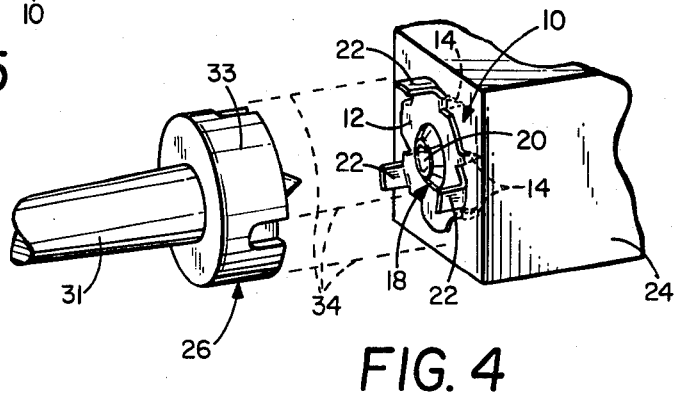
FIG. 4 is an enlarged perspective view showing the manner of attachment of the device of the present invention with a workpiece in the tool center.

A pair of work centers 10 are placed on opposite ends of a workpiece 24 by driving the spurs into the ends of the workpiece. The workpiece and attached work centers are then placed between tool centers 26 and 29 of a lathe 27 as illustrated in FIG. 3. The tool center 26 is preferably a driven tool center rotatably driven by a headstock 30 in turn driven by a motor 28. The tool center 26 has a morse taper shank 31 and a head 33 having slots 32 which receive lugs 22 when the parts are moved together as represented by broken lines 34 in FIG. 4. The tool center 26 also has a conical center tip 36 protruding from the head 33 which engages the seat surface 21 of the centering portion 18. Broken lines 38 (FIG. 3) indicate the position of the tool center 26 when engaging the work center 10. The center tip 32 may engage the workpiece but the amount of penetration is limited.

The tool center 29 can either be a live tool center or a dead tool center. The live tool center is preferred and rotates on bearings. The dead tool center does not rotate. The tool center 29 is positioned in tailstock 40 which positions the tool center 29 along the axis of rotation of the lathe 27. Similarly, the tool center 29 has a shank 41 with a head 43. A conical tip 42, preferably larger than the conical tip 36 of the driven tool center, is coaxially positioned along the axis of rotation on the head 43. The conical tip 42 is of such a size as to prevent the lugs 22 of the workcenter on that end from engaging any portion of the tool center 29.

When the spurs 14 are driven into the workpiece there is minimal damage caused since the spurs 14 are of minimal size. In one working embodiment the spurs are only approximately 3/16 of an inch long and six spurs are sufficient to securely retain the workcenter in the workpiece.

Figure 6:
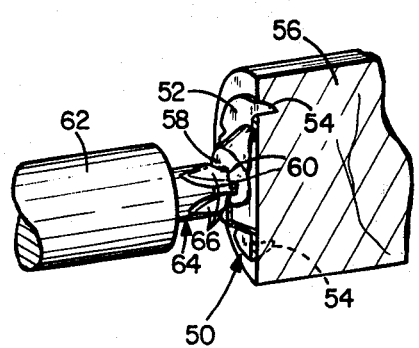
FIG. 6 is a perspective partially cross sectional view of still another embodiment of the present invention.

Other tool centers having different configurations that the tool centers 26, 29 shown in FIG. 3 may also be used with the work center 10. A tool center 48 having an inverted frusto conical surface 44 defining a cavity engages the surface 19 of the centering portion 18 as shown in FIG. 6. In addition, a tool center having a spherical centering element instead of the conical tips 36, 42 shown in FIG. 3, may also be used to engage the surface 21 for centering the workpiece. The sphere engages the frusto conical surface 21 in a similar manner as the conical tips 36 and 42.

Another embodiment of the work center device is shown in FIG. 6 generally indicated at 50. The workcenter 50 similarly has a substantially flat main ring portion 52 with a plurality of integral spurs 54 which are embedded into the workpiece 56. The work center 50 has a centering portion 58 which has a slotted aperture 60 having a plurality of slots for cooperation with a driven tool center 62 having a driving tip 64. The driving tip 64 has a plurality of ribs 66 which engage corresponding slots in the slotted aperture 60. Preferably, the aperture 60 has four slots in the shape of a cross and the tip 64 has four ribs 66 which engage each of the slots, transmitting the driving force from the driving tool center 62 to the workpiece 66. However, any number of ribs and slots are within the scope of the present invention, such as a three-ribbed tip with a corresponding three-slotted passage in the centering portion, or a tip having as many as six ribs engaging a six-slotted passage in the work center.

Figure 5:
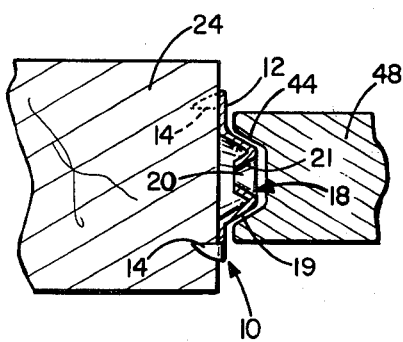
FIG. 5 is a cross sectional view showing another embodiment of the device of the present invention.

In still another embodiment of the present invention the centering seat of the workpiece has a plurality of slots in the surface 19. A driven tool center, similar in configuration to the tool center shown in FIG. 5, has lugs positioned along the surface 44 which extend into the slots of the work center to drive the workpiece 24.

In operation, center points are marked in the usual manner on the ends of the workpiece which is to be turned on the lathe. The work centers 10 are positioned on each end of the workpiece in such a manner that the center or axis of the work center device coincides with the center marked on the end of the workpiece. The spurs of the work centers 10 are embedded into the workpiece preferably using striker blocks which are typically short sections of pipe. The striker block is positioned on the main ring portion and struck with a hammer. The spurs are driven into the workpiece up to the main ring portion with the main ring portion stopping further penetration and resting flush with the end surface of the workpiece for stability.

The drive center is inserted into the headstock end of the lathe and the live center is similarly inserted in the tailstock at the other end of the lathe. The workpiece is then placed between the tool centers and supported by the workcenters. The preferred conical tips of the drive center and the live center project into and engage the centering seats of the work centers. The centering seats prevent excessive penetration of the conical tips into the workpiece. The drive lugs of the work center on the drive end project into the slots on the head of the drive center and provide the drive connection for turning the workpiece. The larger conical tip of the live center does not permit the lugs of the work center to engage the live center. The conical tip of the live center being substantially larger spaces the lugs from the head of the live center while still axially centering the workpiece.

The work center devices are left in place on the workpiece until all the operations on the workpiece have been completed. Long workpieces can be turned end-for-end without losing the true center of rotation of the workpiece. It is desirable to cut long workpieces near the drive tool center to provide stability during cutting of the workpiece. Using the present invention, the center of rotation previously used is not lost, reducing time and costs while producing a better product. The workpiece can also be removed from one lathe and placed on another lathe for a different turning operation without losing the center of rotation. After the cutting operation on a workpiece has been completed, the work center devices can be removed and reused on other workpieces.

CONCLUSION

The present invention provides a device that easily centers the workpiece between the tool centers of a lathe and permits the tool centers of the lathe to axially hold the workpiece without splitting or frictionally damaging its ends. The work center device also provides a means for centering the workpiece such that once the center of rotation is established, the center of rotation will not be lost when the workpiece is transferred from one lathe to another or when turned end-for-end on the same lathe.

The work centers also positively limit the penetration of the centers into the workpiece. Once they are home, even large increases in axial force do not result in increased penetration into the workpiece.

Although the present invention has been described with reference to preferred embodiments, persons skilled in the art will recognize that changes may be made in form and detail without departing from the spirit and scope of the invention.

What is claimed is:

1. A device for centering a workpiece on a tool center, the device comprising:
    a workpiece centering member formed integrally from a single piece of metal, and including a flat annular main ring portion having a side surface defining a reference plane, a peripheral edge and an integral centering seat portion;
    a plurality of drive lugs integral with the ring portion attached to the peripheral edge and projecting away from the reference plane in a first direction;
    a plurality of spurs integral with the ring portion adjacent the peripheral edge and projecting from the plane in a second direction opposite from the first direction; and
    the integral centering seat portion being formed about a central axis and having portions spaced outwardly from the central axis projecting from the ring portion in the first direction along the axis, and further being formed in a direction back toward the reference plane on portions of the centering seat portion adjacent the central axis to thereby form an integral annular generally frusto conical seat surface of desired length concentric with the peripheral edge and the central axis, the seat surface terminating on the same side of the reference plane as the ring to prevent penetration of the seat surface into a workpiece and to limit penetration of a center member with which the workpiece centering member is used.

2. The device of claim 1, wherein the plurality of spurs are partially punched from the ring portion and are within the circumference described by the largest diameter of the ring portion.

* * * * *